(12) United States Patent
Tioe et al.

(10) Patent No.: US 6,952,470 B1
(45) Date of Patent: Oct. 4, 2005

(54) APPARATUS AND METHOD FOR MANAGING A CALL CENTER

(75) Inventors: Thomas Tioe, Duluth, GA (US); Brett D. Johnson, Dallas, GA (US); Nester C. Febles, Lawrenceville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 794 days.

(21) Appl. No.: 09/935,955

(22) Filed: Aug. 23, 2001

(51) Int. Cl.[7] ................ H04M 3/22; H04M 3/523
(52) U.S. Cl. ............... 379/265.03; 379/32.01; 379/265.06
(58) Field of Search ............. 379/265.01, 265.02, 379/265.03, 265.04, 265.05, 265.06, 265.07, 379/265.08, 265.09, 266.01, 266.06, 32.01, 379/32.02, 32.04

(56) References Cited

U.S. PATENT DOCUMENTS

| | | | |
|---|---|---|---|
| 5,621,789 A * | 4/1997 | McCalmont et al. .. | 379/265.06 |
| 5,754,631 A | 5/1998 | Cave ................. | 379/88.07 |
| 5,864,616 A * | 1/1999 | Hartmeier ............ | 379/265.03 |
| 6,237,047 B1 | 5/2001 | Peebles et al. ........ | 710/5 |
| 6,748,072 B1 * | 6/2004 | McGraw et al. ....... | 379/265.03 |

* cited by examiner

Primary Examiner—Harry S. Hong
(74) Attorney, Agent, or Firm—Withers & Keys, LLC (57) ABSTRACT

An apparatus. The apparatus includes a processor adapted for communication via a communication network. The processor includes a monitoring module for requesting and receiving information associated with a device configured for communication via the communication network, and a warning module for generating a warning when the received information is indicative of a predetermined condition.

23 Claims, 4 Drawing Sheets

APPARATUS AND METHOD FOR MANAGING A CALL CENTER

BACKGROUND OF INVENTION

1. Field of Invention

The present invention relates generally to telecommunications and, more particularly, to and apparatus and method for managing a call center.

2. Description of the Background

The telephone has become an important business tool for companies that rely on telephones to market products and services and to provide services to their customers. The companies typically utilize a combination of hardware and software, referred to collectively as a call center, to efficiently handle and manage the large number of incoming and outgoing calls associated with such uses. Although call centers, vary in size and complexity, many call centers generally include an automatic call distributor, a number of operator workstations, and a number of voice response units. Call centers may also include devices such as automatic dialers, wallboards, readerboards, and various servers such as, for example, command servers, database servers, reporting servers, and application servers.

An automatic call distributor is a device that receives incoming calls, distributes the incoming calls to operator workstations or to voice response units, and produces information that is valuable to call center managers. For an incoming call that requires the assistance of an operator, the automatic call distributor may distribute the call to an operator workstation. An operator workstation is manned by an operator and typically includes a computer and a telephone. For an incoming call that does not require the assistance of an operator, the automatic call distributor may distribute the call to a voice response unit. A voice response unit is a device that provides a voice menu of options available to the caller, prompts the caller to select an option, and recognizes information entered by the caller. Information produced by the automatic call distributor includes information pertaining to the arrival of incoming calls, information on abandoned calls, and information on the origin of the incoming calls. Call center managers use this information to optimize the operation of the call center.

Even with the information available from the automatic call distributor, managing a call center can be a difficult task. Due to fiscal constraints, the level of call center staffing is often limited. At any one time, the number of incoming calls generally exceeds the number of operators available to receive the calls. As a result, callers are often placed in queues for a short period of time until an operator or voice response unit becomes available. If callers have to wait in a queue for what they determine to be too long of a time period, the caller may abandon the call before having the opportunity to speak to an operator or a voice response unit. Abandoned calls represent dissatisfied customers and potential lost revenue for the company.

In addition to staffing constraints, call center managers must also be concerned with the reliability of the call center equipment. For example, if the automatic call distributor is unable to distribute incoming calls to the voice response units, the automatic call distributor may attempt to distribute all incoming calls to operator workstations. In response to the increased number of calls distributed to operator workstations, the call waiting queues associated with operator workstations may quickly reach capacity, thus contributing to an increase in abandoned calls and preventing the call center from receiving any additional incoming calls. In many instances, the call center manager does not become aware of the cause of the breakdown until a number of customers have been dissatisfied with the performance of the call center.

Accordingly, there exists a need for a system and method for managing a call center that overcomes the limitations, shortcomings, and disadvantages of the prior art.

BRIEF SUMMARY OF THE INVENTION

The present invention meets the identified need, as well as other needs, as will be more fully understood following a review of this specification and the accompanying drawings. The present invention is directed to an apparatus. According to one embodiment, the apparatus includes a processor adapted for communication via a communication network. The processor includes a monitoring module for requesting and receiving information associated with a device configured for communication via the communication network, and a warning module for generating a warning when the received information is indicative of a predetermined condition.

The present invention is also directed to a method for managing a call center. According to one embodiment, the method includes monitoring a device associated with the call center and connected to a communication network, and generating a warning when a predetermined condition is indicated.

BRIEF DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a conventional telecommunications network. Certain devices such as, for example, an automatic dialer associated with the call center are not described herein. Those of ordinary skill in the art will recognize, however, that these and other elements may be desirable in a typical call center. However, because such elements are well known in the art, and because they do not facilitate a better understanding of the present invention, a discussion of such elements is not provided herein.

Figure 1:
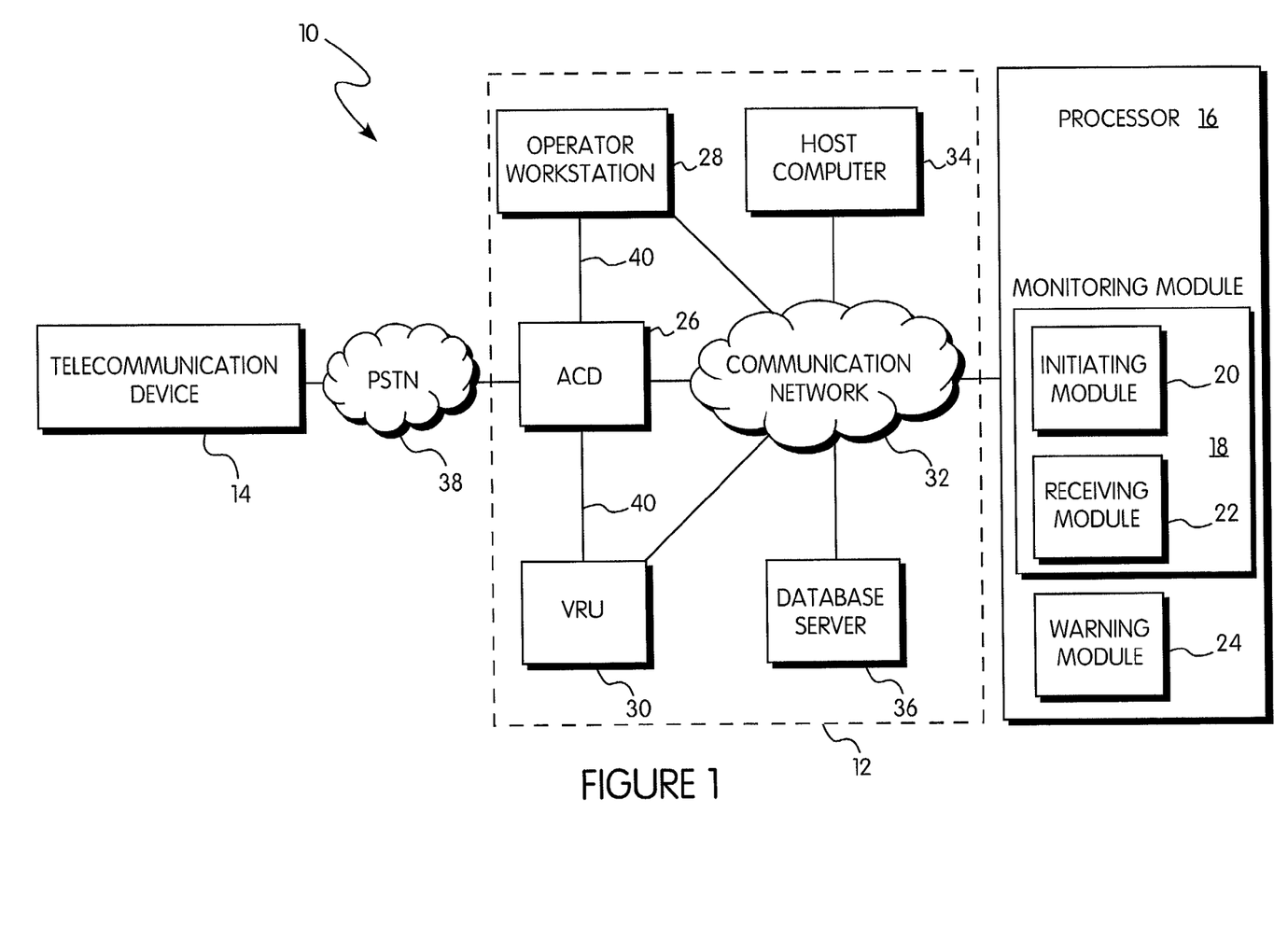
FIG. 1 is a diagram of a system incorporating one embodiment of the present invention.

FIG. 1 is a diagram of a system 10 incorporating one embodiment of the present invention. The system 10 includes a call center 12 configured for communication with a telecommunications device 14 and a processor 16. The telecommunications device 14 may be, for example, a landline telephone, a wireless telephone, a personal digital assistant, or a computer. The processor 16 may include a monitoring module 18 having an initiation module 20 and a receiving module 22, and a warning module 24. The modules 18, 20, 22, and 24 will be described in more detail hereinbelow.

The call center 12 may include an automatic call distributor 26, an operator workstation 28, and a voice response unit 30. The automatic call distributor 26, the operator workstation 28, and the voice response unit 30 may each be connected to a communication network 32 such as, for example, a local area network or a wide area network, and configured for communication with the processor 16 via the communication network 32. Although the call center 12 illustrated in FIG. 1 only shows a single operator workstation 28 and a single voice response unit 30, it is understood by one skilled in the art that the call center may include a plurality of operator workstations 28 and a plurality of voice response units 30. The call center may also include a host computer 34 and a database server 36 connected to the communication network 32.

The automatic call distributor 26 may be, for example, a standalone automatic call distributor, a central office-based automatic call distributor, or an automatic call distributor integrated with a private branch exchange. The automatic call distributor 26 may be configured for communication with the telecommunications device 14 via a telephone network 38 such as, for example, the public switched telephone network (PSTN) and/or a wireless network. The automatic call distributor 26 may also be configured for communication with the operator workstation 28 and the voice response unit 30 via, for example, one or more T-1 trunk lines 40, where each T-1 trunk line 40 includes twenty-four voice lines. The automatic call distributor 26 may control the routing of incoming calls originating from the telecommunications device 14 to the operator workstation 28 or the voice response unit 30.

Incoming calls requiring the assistance of an operator may be routed from the automatic call distributor 26 to the operator workstation 28. The operator workstation 28 may be manned by an operator or a call center supervisor and may include, for example, a telephone configured for communication with the automatic call distributor 26, a terminal or computer connected to the communication network 32, and productivity devices such as headsets and displays. From the operator workstation 28, an operator or call center supervisor may have access to information provided by the database server 36 connected to the communication network 32. Such information may include, for example, information associated with the caller and the call center.

Incoming calls that do not require the assistance of an operator may be routed from the automatic call distributor 26 to the voice response unit 30. The voice response unit 30 may include a voice interface, a data interface, and one or more processing boards, and may communicate with either the communication network 32 or the telephone network 38. The voice interface allows the voice response unit 30 to communicate with the automatic call distributor 26 via the plurality of voice lines provided by the one or more T-1 trunk lines 40 connecting the automatic call distributor 26 to the voice response unit 30. Thus, the automatic call distributor 26 may route an incoming call to the voice response unit 30 via one of the plurality of voice lines connecting the automatic call distributor 26 to the voice response unit 30. The data interface allows the voice response unit 30 to communicate with, for example, the database server 36 connected to the communication network 32. Thus, the voice response unit 30 may have access to information provided by the database server 36. Such information may include, for example, information associated with the caller and the call center. The ability to access the information allows the voice response unit 30 to offer callers access to information such as, for example, account balances, twenty-four hours a day, three-hundred-sixty-five days a year.

The host computer 34 may be connected to the communication network 32 and adapted to run applications software. The database server 36 may be connected to the communication network 32 and adapted to store information such as, for example, customer billing information.

From the foregoing, it is apparent to one skilled in the art that each voice response unit 30 may receive signals originating from the communication device 14 or from a device connected to the communication network 32 and process those signals in accordance with commands transmitted from the host computer 34.

The processor 16 may be a central processing unit (CPU) including, e.g., a microprocessor, an application specific integrated circuit (ASIC), or one or more printed circuit boards. The processor 16 may be adapted for communication via the communication network 32. As illustrated in FIG. 1, the processor 16 may be connected to the communication network 32 and may include a monitoring module 18 comprising an initiation module 20 and a receiving module 22, and a warning module 24. The monitoring module 18 is for requesting and receiving information associated with a device configured for communication via the communication network 32. The initiation module 20 is for querying a status of such a device and the receiving module 22 is for receiving an indication of the status. According to one embodiment, the initiating module 20 may initiate the request for information associated with such a device and the receiving module 22 may receive the requested information. For example, the initiation module 20 may initiate a request for information associated with the voice response unit 30 and the receiving module 22 may receive the requested information. The information requested and received by the modules 20, 22, respectively, may include information such as, for example, the status of the connection between the voice response unit 30 and the communication network 32, the status of the voice lines connecting the automatic call distributor 26 to the voice response unit 30, or the status of the connection between the voice response unit 30 and the database server 36. The warning module 24 is for generating a warning when the information received by the receiving module 22 is indicative of a predetermined condition. Examples of predetermined conditions include conditions such as, for example, an indication of a connection problem between the voice response unit 30 and the communication network 32, an indication that a voice line connecting the automatic call distributor 26 to the voice response unit 30 has not handled a call for a given period of time, or detection of an error condition for routines run on the database server 36.

The modules 18, 20, 22, and 24 may be implemented as microcode configured into the logic of the processor 16, or may be implemented as programmable microcode stored in an electrically erasable programmable read only memory (EEPROM). According to another embodiment, the modules 18, 20, 22, and 24 may be implemented as software code to be executed by the processor 16. The software code, may be written in any suitable programming language using any suitable programming technique. For example, the software code may be written in C using procedural programming techniques, or in Java or C++ using object oriented programming techniques. The software code may be stored as a series of instructions or commands on a computer readable medium, such as a random access memory (RAM) or a read only memory (ROM), a magnetic medium such as a hard-drive or a floppy disk, or an optical medium such as a CD-ROM.

Figure 2:
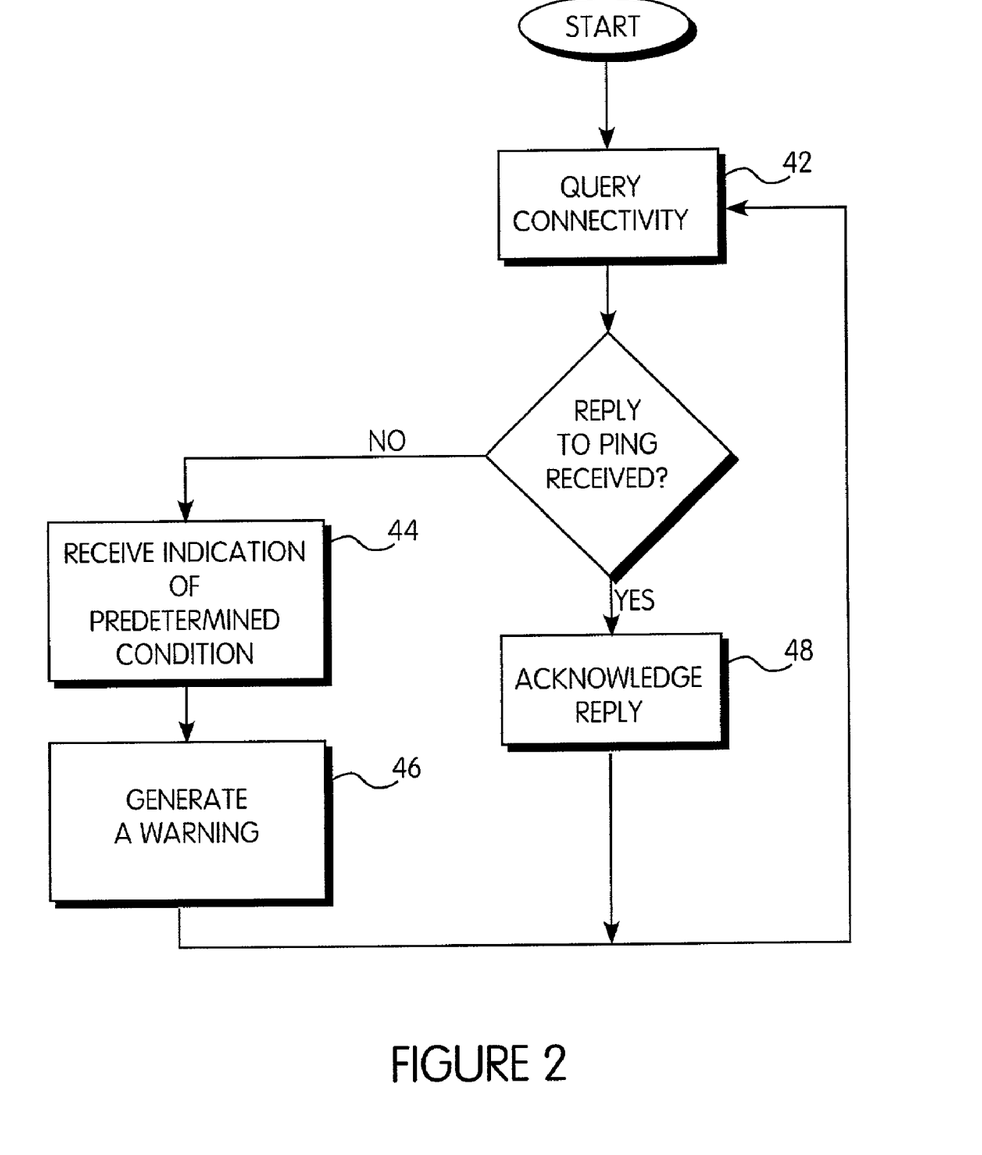
FIG. 2 is a diagram illustrating a process flow through the processor of FIG. 1 according to one embodiment of the present invention.

FIG. 2 is a flowchart illustrating a process flow through the processor 16 according to one embodiment of the present invention. The process flow of FIG. 2 begins at block 42 where the initiating module 20 queries the connectivity of a device connected to the communication network 32. The device may be, for example, the automatic call distributor 26, the operator workstation 28, the voice response unit 30, or any other suitable device connected to the communication network 32. As used herein, a suitable device is any device having an operating system associated therewith. According to one embodiment, the initiating module 20 may query the connectivity of the voice response unit 30 to the communication network 32 by sending a packet to an address associated with the voice response unit 30 via the communication network 32. The sending of the packet to ascertain the presence of the voice response unit 30 on the communication network 32 is commonly referred to as "pinging", where "ping" is an acronym for Packet Internet Groper.

If the receiving module 22 does not receive a reply to the ping, the process proceeds from block 42 to block 44, where the warning module 24 receives an indication of the existence of a predetermined condition, i.e., a failure to receive a reply from the ping. From block 44, the process proceeds to block 46, where the warning module 24 generates a warning that the voice response unit 30 may be experiencing operational problems. The warning generated by the warning module 24 may be in the form of an e-mail transmitted to a desktop computer, a wireless phone, a personal digital assistant, or a pager such as, for example, an interactive pager. The warning may include, for example, identification information associated with the voice response unit 30, operational information associated with the voice response unit 30, and information associated with a desired action plan. Identification information associated with the voice response unit 30 may include, for example, the designation of the host computer 34 associated with the voice response unit 30, and an IP address associated with the voice response unit 30. Operational information associated with the voice response unit 30 may include, for example, information concerning the amount of time elapsed since the voice response unit 30 last handled a call from the automatic call distributor 26. Information associated with a desired action plan may include, for example, the name and phone number of a designated contact person.

If the receiving module 22 does receive a reply to the ping, the process proceeds from block 42 to block 48, where the receiving module 22 acknowledges receipt of the reply. The receipt of a reply to the ping is an indication that the voice response unit 30 is connected to the communication network 32.

From blocks 46 and 48, the process proceeds back to block 42, where the initiating module 20 queries the connectivity of another suitable device connected to the communication network 32. From block 42, the process proceeds as described hereinbefore.

Figure 3:
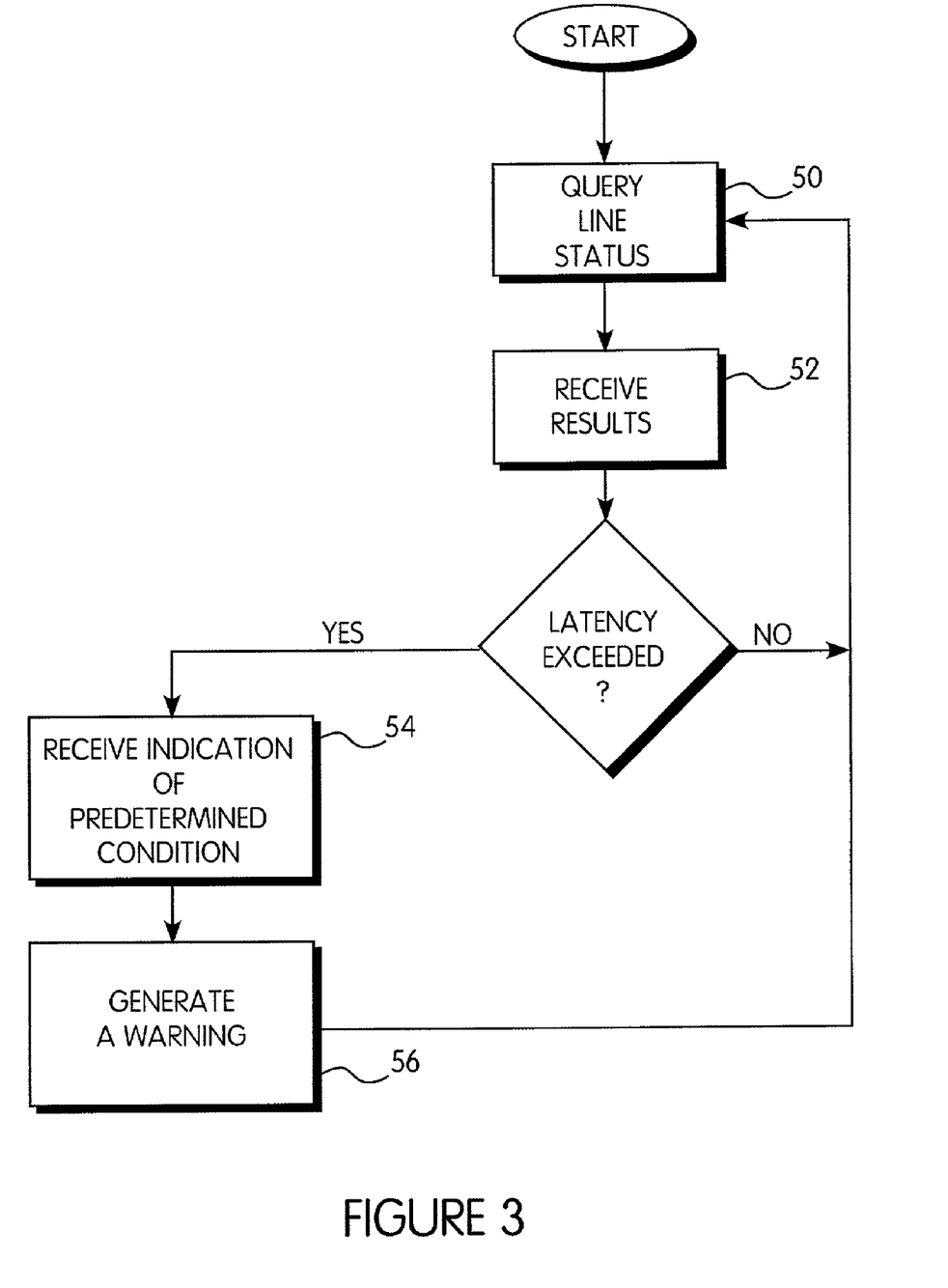
FIG. 3 is a diagram illustrating a process flow through the processor of FIG. 1 according to another embodiment of the present invention.

FIG. 3 is a flowchart illustrating the process flow through the processor 16 according to another embodiment of the present invention. The process flow of FIG. 3 begins at block 50 where the initiating module 20 queries the status of one of the voice lines connecting the voice response unit 30 to the automatic call distributor 26. The initiating module 20 may query the status of the voice line by transmitting a remote procedure call (RPC) request to the voice response unit 30 via the communication network 32. A remote procedure call is a programming interface that allows one program to use the services of another program in a remote device. The calling program sends a message and data to the remote program, which is executed, and results are passed back to the calling program. According to this embodiment, the calling program may reside with processor 16 and the remote program may reside with the voice response unit 30. From block 50, the process proceeds to block 52, where the receiving module 22 receives the results passed back to the calling program. The results may include, for example, the system time and the last time that the voice line handled a call routed from the automatic call distributor 26.

If the amount of time elapsed since the voice line last handled a call from the automatic call distributor 26 does not exceed a predefined latency threshold, the process proceeds from block 52 back to block 50, where the initiating module 20 may query the status of another one of the voice lines connecting the voice response unit 30 to the automatic call distributor 26. According to one embodiment, the latency threshold may be configurable to account for the varying call volumes that occur on certain days and/or during certain hours. For example, the latency threshold may be set lower during periods that the call center historically experiences higher call volumes and the latency threshold may be set higher during periods that the call center historically experiences lower call volumes. As long as the amount of time elapsed since ID the voice line being queried last handled a call routed from the automatic call distributor 26 does not exceed the latency threshold, the processor 16 will continue to query additional voice lines connecting the automatic call distributor 26 to the voice response unit 30.

If the amount of time elapsed since the line last handled a call routed from the automatic call distributor 26 does exceed the predefined latency, the process proceeds from block 52 to block 54, where the warning module 24 receives an indication of the existence of a predetermined condition, i.e., a predefined latency being exceeded. From block 54, the process proceeds to block 56, where the warning module 24 generates a warning that the voice line may be experiencing operational problems. The warning generated by the warning module 24 may be in the form of an e-mail transmitted to a desktop computer, a wireless phone, a personal digital assistant, or a pager such as, for example, an interactive pager. The warning may include, for example, identification information associated with the voice line, operational information associated with the voice line, and information associated with a desired action plan. Identification information associated with the voice line may include, for example, the designation of the host computer 34 associated with the voice response unit 30 that the voice line is connected to, an IP address associated with the voice response unit 30 that the voice line is connected to, and a line designation such as, for example, line 23, associated with the voice line experiencing the operational problem. Operational information associated with the voice line may include, for example, information concerning the amount of time elapsed since the line last handled a call routed from the automatic call distributor 26 and the predefined latency threshold associated with the voice line. The information associated with a desired action plan may include, for example, the name and phone number of a designated contact person. From block 56, the process proceeds back to block 50, where the initiating module 20 queries the status of another one of the voice lines connecting the voice response unit 30 to the automatic call distributor 26.

Figure 4:
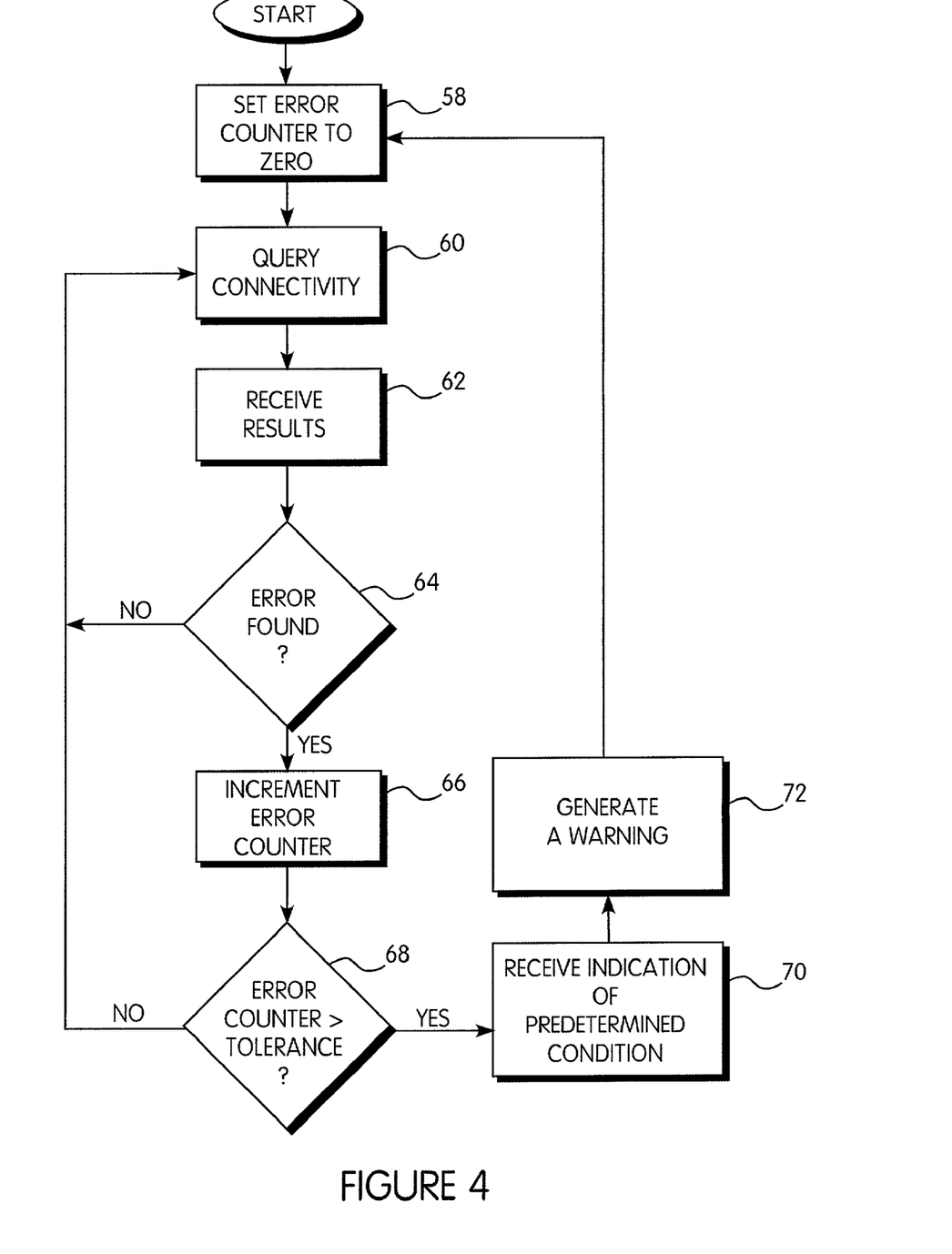
FIG. 4 is a diagram illustrating a process flow through the processor of FIG. 1 according to another embodiment of the present invention.

FIG. 4 is a flowchart illustrating the process flow through the processor 16 according to another embodiment of the present invention. According to this embodiment, the voice response unit 30 may be programmed to only handle certain types of calls such as, for example, calls that have indicated a desire to access billing information. The billing information may, for example, be stored on the database server 36. Such calls may be initiated by, for example, a person, a facsimile machine, an answering service, or a modem, and may be routed from the automatic call distributor 26 to the voice response unit 30 via one of the voice lines connecting the automatic call distributor 26 to the voice response unit 30.

The process flow of FIG. 4 begins at block 58 where a value associated with an error counter is set to zero. From block 58, the process proceeds to block 60, where the initiating module 20 queries the status of the connection between the voice response unit 30 and the database server 36. The initiating module 20 may query the status of the connection by transmitting an RPC request to the voice response unit 30, the RPC request requiring the execution of a program by the database server 36. From block 60, the process proceeds to block 62, where the receiving module 22 receives the results of the program executed by the database server 36. From block 62, the process proceeds to block 64, where the received results are compared to expected results.

If the results are as expected, the results represent an indication of a satisfactory connection between the voice response unit 30 and the database server 36, and the process proceeds from block 64 back to block 60, where the initiating module 20 queries the status of the connection between another suitable device such as, for example, another voice response unit 30, and the database server 36. The process may continue to follow the loop from block 60 to block 62 to block 64 back to block 60 as long as the results are as expected.

If the results are not as expected, the results represent an indication of the existence of a potential problem with the connection between the voice response unit 30 and the database server 36, and the process proceeds from block 64 to block 66, where the value associated with the error counter is incremented by one. From block 66, the process proceeds to block 68, where the value associated with the error counter is compared to a predefined tolerance value.

If the value associated with the error counter is less than or equal to the predefined tolerance value, the process proceeds from block 68 back to block 60, where the initiating module 20 queries the status of the connection between another suitable device such as, for example, another voice response unit 30 and the database server 36. The process may continue to follow the loop from block 60 to block 62 to block 64 to block 66 to block 68 back to block 60 as long as the value associated with the error counter is less than or equal to the predefined tolerance value.

However, if the value associated with the error counter is greater than the predefined tolerance value, the process proceeds from block 68 to block 70, where the warning module 24 receives an indication of the existence of a predetermined condition, i.e., too many voice response units 30 having a potential connection problem with the database server 36. From block 68, the process proceeds to block 70, where the warning module generates a warning indicating that the number of voice response units 30 having potential connection problems with the database server 36 has exceeded a predefined tolerance value. The warning generated by the warning module 24 may be in the form of an e-mail transmitted to a desktop computer, a wireless phone, a personal digital assistant, or a pager such as, for example, an interactive pager. The warning may include, for example, identification information associated with one or more voice response units 30 and/or the database server 36, operational information associated with one or more voice response units 30, and information associated with a desired action plan. Identification information associated with one or more voice response units 30 may include, for example, the designation of the host computer 34 associated with the voice response units 30 that may be experiencing connectivity problems with the database server 36, and the IP addresses associated with the voice response units 30. Operational information associated with the one or more voice response units 30 may include, for example, information concerning the amount of time elapsed since a particular voice response unit 30 last received data from the database server 36, and the predefined tolerance value associated with the error counter. Information associated with a desired action plan may include, for example, the name and phone number of a designated contact person. From block 72, the process proceeds back to block 58 where the process proceeds as described hereinbefore.

According to another embodiment, the predefined tolerance value may be a series of increasing tolerance values, such that when each succeeding tolerance value is exceeded, the urgency of the warning is escalated accordingly.

Although the present invention has been described and illustrated in detail herein with respect to certain embodiments, i.e., those associated with a call center, it is clearly understood that the same is by way of example and is not to be taken by way of limitation. For example, the present invention may be modified to monitor any device having an operating system and being connected to a common communication network. It will be appreciated by those of ordinary skill in the art that numerous modifications and variations of the present invention may be implemented without departing from the spirit and scope of the present invention as described in the appended claims.

What is claimed is:

1. An apparatus, comprising:
   a processor adapted for communication via a communication network including:
   a monitoring module for requesting and receiving information associated with a device configured for communication via the communication network;
   an error counter to record the number of times a device does not reply to a information request;
   a warning module for generating and transmitting a warning when the error counter exceeds a predefined tolerance level, and
   a database server in which to store one or more device error count tolerance levels, a set of device identification information to identify the subject device in the warning, a set of device operating information to be included in the warning and a set of information associated with a desired action plan directing where the warning should be sent.

2. The apparatus of claim 1, wherein the monitoring module includes:
   an initiating module for querying a status of the device; and
   a receiving module for receiving an indication of the status.

3. The apparatus of claim 1, wherein the device includes a device selected from the group consisting of an automatic call distributor, an operator workstation, a voice response unit, a host computer, a database server, an automatic dialer, a wallboard, a readerboard, a command server, a reporting server, and an application server.

4. The apparatus of claim 1, wherein the communication network includes a local area network.

5. The apparatus of claim 1, wherein the communication network includes a wide area network.

6. A processor adapted for communication via a communication network comprising:
   means for requesting and receiving information associated with one or more devices configured for communication via the communication network;
   means for incrementing an error counter associated with a device if the device does not reply to a request for information and comparing the error counter value to a series of increasing predetermined tolerance levels;
   means for generating a warning of escalating urgency when the received information causes the error counter value to exceed a escalating set of predetermined tolerance levels wherein the warning includes a set of device identification information, a desired action plan and a set of device operational information; and
   means for transmitting the warning.

7. The processor of claim 6, wherein the means for requesting and receiving information associated with a device configured for communication via the communication network includes:
   means for querying a status of the device; and
   means for receiving an indication of the status.

8. A computer-readable medium having stored thereon a set of instructions which, when executed by a processor, cause the processor to perform the steps of:
   requesting and receiving information associated with a device configured for communication via the communication network;
   determining the existence of a predetermined condition for a device from the received information;
   generating a warning when the received information is indicative of a predetermined condition being met, wherein the warning includes a set of device identification information, a desired action plan and a set of device operational information wherein the device operational information comprises one or more of: a value indicative of a period of time since the particular device last handled a call, a value indicative of a period of time since a particular voice line connected to the particular device last handled a call, a predefined latency threshold value stipulating the maximum allowable time since a particular voice line last handled a call associated with a particular device, a value associated with an error counter representing the number of queries that did not receive a reply and a predefined tolerance value associated with the error counter; and
   transmitting the warning.

9. A method for managing a call center, comprising:
   monitoring one or more devices and their one or more associated voice lines, which are integral with the call center and which are connected to a communication network, by transmitting a Remote Procedure Call to the device and receiving a reply;
   measuring an elapsed time since the last reply from a device;
   comparing the elapsed time to a predefined latency threshold value assigned to the device;
   repeating the monitoring, measuring and comparing steps until the device's predefined latency threshold is surpassed;
   generating a warning when the predefined latency threshold is surpassed wherein the warning includes a set of device identification information, a desired action plan and a set of device operational information; and
   transmitting the warning.

10. The method of claim 9, wherein the device operational information comprises one or more of: a value indicative of a period of time since the particular device last handled a call, a value indicative of a period of time since a particular voice line connected to the particular device last handled a call, the predefined latency threshold value stipulating the maximum allowable time since a particular voice line last handled a call associated with a particular device, a value associated with an error counter and a predefined tolerance value associated with the error counter.

11. The method of claim 9, wherein monitoring a device associated with a call center includes pinging the device and receiving a reply.

12. The apparatus of claim 6, wherein the device operational information comprises one or more of: a value indicative of a period of time since the particular device last handled a call, a value indicative of a period of time since a particular voice line connected to the particular device last handled a call, a predefined latency threshold value stipulating the maximum allowable time since a particular voice line last handled a call associated with a particular device, a value associated with an error counter and a predefined tolerance value associated with the error counter.

13. The method of claim 9, wherein generating a warning when a predetermined condition is indicated includes generating a warning when the device is not connected to the communication network.

14. The method of claim 9, wherein generating a warning when a predetermined condition is indicated includes generating a warning when a voice line of the device is not operational.

15. The method of claim 9, wherein transmitting a warning includes transmitting a warning to a desktop computer.

16. The method of claim 9, wherein transmitting a warning includes transmitting a warning to a wireless phone.

17. The method of claim 9, wherein transmitting a warning includes transmitting a warning to a personal digital assistant.

18. The method of claim 9, wherein transmitting a warning includes transmitting a warning to a pager.

19. The method of claim 9, wherein transmitting a warning includes transmitting a name and phone number associated with a designated contact person.

20. The method of claim 9, wherein transmitting device identification information includes transmitting an IP address associated with the device.

21. The method of claim 9, wherein transmitting a predefined tolerance value includes transmitting one of a series of increasing tolerance values.

22. A method for managing a call center, comprising:
   means for monitoring one or more devices and their one or more associated voice lines, which are integral with the call center and which are connected to a communication network by requesting and receiving information from the device;
   means for incrementing an error counter associated with a device if a device does not reply;
   means for comparing the error counter value to a set of predetermined tolerance levels;

means for generating a warning when a predetermined condition is indicated by the error counter value based on the predetermine tolerance levels wherein the warning includes a set of device identification information, a desired action plan and a set of device operational information wherein the device operational information comprises one or more of: a value indicative of a period of time since the particular device last handled a call, a value indicative of a period of time since a particular voice line connected to the particular device last handled a call, the predefined latency threshold value associated with the particular voice line connected to the particular device, a value associated with an error counter and a predefined tolerance value associated with the error counter; and means for transmitting the warning.

23. The method of claim 22, wherein the means for monitoring a device associated with the call center and connected to a communication network includes:

means for querying a status of the device; and means for receiving an indication of the status.

* * * * *